(12) United States Patent
Zacche' et al.

(10) Patent No.: US 7,107,766 B2
(45) Date of Patent: Sep. 19, 2006

(54) HYDRAULIC PRESSURIZATION SYSTEM

(75) Inventors: Vanni Zacche', Parma (IT); Alessandro Gorbi, Parma (IT); Massimiliano Dal Cielo, Parma (IT)

(73) Assignee: SIG Simonazzi S.p.A., Parma (IT)

( * ) Notice: Subject to any disclaimer, the term of this patent is extended or adjusted under 35 U.S.C. 154(b) by 0 days.

(21) Appl. No.: 10/474,166

(22) PCT Filed: Apr. 6, 2001

(86) PCT No.: PCT/IT01/00175

§ 371 (c)(1),
(2), (4) Date: Apr. 26, 2004

(87) PCT Pub. No.: WO02/086326

PCT Pub. Date: Oct. 31, 2002

(65) Prior Publication Data

US 2004/0168436 A1   Sep. 2, 2004

(51) Int. Cl.
*F15B 3/00* (2006.01)
*F15B 1/02* (2006.01)

(52) U.S. Cl. .................. 60/413; 60/563; 91/6; 91/32
(58) Field of Classification Search .............. 60/413, 60/416, 563; 91/6, 28, 29, 32, 33
See application file for complete search history.

(56) References Cited

U.S. PATENT DOCUMENTS

| | | | | |
|---|---|---|---|---|
| 1,888,990 A | | 11/1932 | Kurath | |
| 2,706,891 A | * | 4/1955 | Greer | 60/565 |
| 3,945,206 A | * | 3/1976 | Krause | 60/416 |
| 3,945,207 A | | 3/1976 | Hyatt | |
| 4,142,368 A | * | 3/1979 | Mantegani | 60/413 |
| 4,693,080 A | | 9/1987 | Van Hooff | |
| 4,924,671 A | * | 5/1990 | Reinert | 60/428 |
| 4,955,195 A | * | 9/1990 | Jones et al. | 60/413 |
| 5,971,027 A | | 10/1999 | Beachley et al. | |

FOREIGN PATENT DOCUMENTS

| | | |
|---|---|---|
| EP | 1 048 608 A1 | 11/2000 |
| FR | 930 207 | 1/1948 |
| WO | 87/01161 | 2/1987 |
| WO | 00/37800 | 6/2000 |

OTHER PUBLICATIONS

International Search Report dated Feb. 13, 2002, for Application No. PCT/IT01/00175.

* cited by examiner

*Primary Examiner*—Igor Kershteyn
(74) *Attorney, Agent, or Firm*—Hogan & Hartson LLP

(57) ABSTRACT

The present invention relates to a hydraulic pressurization system, in particular for application to pressurization devices operating in accordance with the high hydrostatic pressure principle. In particular, the present invention provides a pressurization system for modifying the pressure in a pressurization device. The system comprising a first hydraulic circuit in which one or more primary pressure accumulators are connected to the pressurization device in controlled manner in order to permit a substantially incompressible fluid to be admitted to and removed from the pressurization device at a first pressure, the primary pressure accumulators being precompressed-gas pressure accumulators.

22 Claims, 3 Drawing Sheets

HYDRAULIC PRESSURIZATION SYSTEM

FIELD OF THE INVENTION

The present invention relates to a hydraulic pressurization system, in particular for application to pressurization devices operating in accordance with the high hydrostatic pressure principle.

BACKGROUND ART

The present Applicant's published European patent application No. EP 1 048 608 describes apparatus for continuous sterilization of packaged foodstuffs which comprises a treatment, at high hydrostatic pressure, of beverages previously introduced into containers made of deformable material (for example, polyethylene terephthalate) which are sealed before treatment. The containers are introduced into suitable pressurization chambers which are then filled with a substantially incompressible liquid such as water and in which the hydrostatic pressure is imparted by a piston provided with a pressure-multiplier. The piston is driven by a mechanical device comprising a cam and operated by a motor.

However, in order to be able to perform an effective sterilization cycle, which in turn comprises pressurization and partial depressurization stages in succession, within the short time required by a continuous operation such as that described in the above-mentioned European patent application, the system for transmitting the pressure from the actuator to the piston must be extremely efficient, in other words, the time elapsing between the energization of the actuator and the reaching of the desired pressure inside the pressurization chamber must be as short as possible. A mechanical system such as that described above does not fully comply with these requirements.

SUMMARY OF THE INVENTION

The problem underlying the present invention is therefore to provide a pressurization system which solves the problems of the devices of the prior art, in particular which permits quick and effective pressurization.

This problem is solved by a pressurization system as defined in the appended claims.

Further characteristics and advantages of the pressurization system of the present invention will become clearer from the description of two preferred embodiments, given below by way of non-limiting example, with reference to the following drawings.

DETAILED DESCRIPTION OF THE INVENTION

Figure 1:
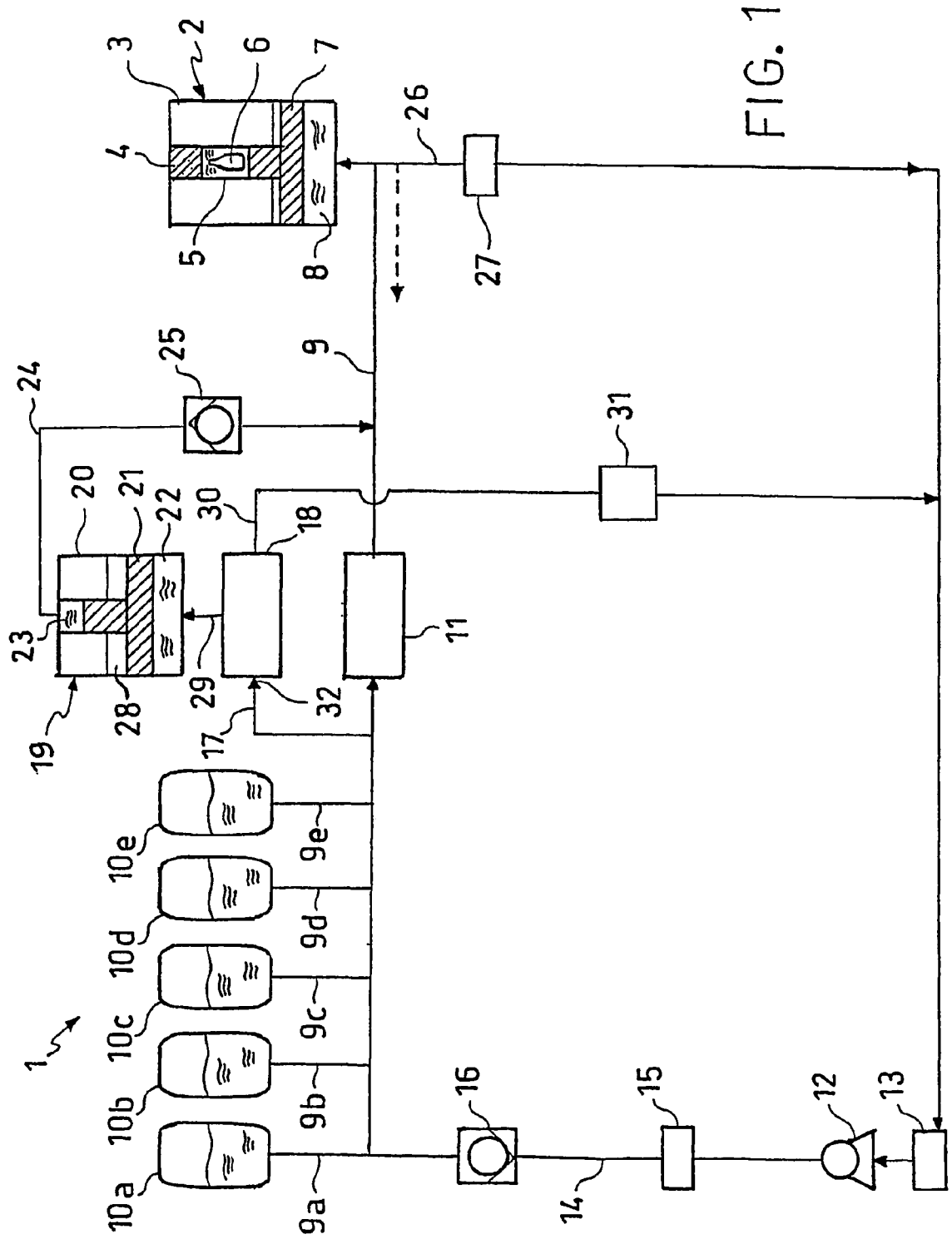
FIG. 1 is a partially-sectioned, schematic view of the pressurization system according to the present invention.

With reference to FIG. 1, the pressurization system, generally indicated 1, acts on a high hydrostatic-pressure pressurization device 2 comprising a housing 3 which has a removable closure element 4 and inside which a pressurization chamber 5 is defined for housing one or more objects 6, for example bottles, to be processed at high hydrostatic pressures. A piston 7, acting inside the pressurization chamber 5, has a T-shaped cross-section the larger-diameter end of which defines, together with the walls of the housing 3, a chamber 8 filled with a substantially incompressible fluid which, in the embodiment described, is hydraulic oil. A duct (not shown in the drawing), extending throughout a wall of the housing 3 which defines the chamber 8, is connected to the pressurization system of the present invention by means of a tube 9 which admits the hydraulic oil to the chamber 8 at high pressure. An example of a pressurization device to which the pressurization system of the present invention may advantageously be applied is that described in the European patent application No. 00830705.0 which was filed on 26th Oct. 2000 in the name of the Applicant of the present patent application and the description of which is incorporated herein by reference.

Turning now to the description of the pressurization system of the present invention, the tube 9 is connected, by means of respective tube connectors 9a, 9b, 9c, 9d, 9e, to a plurality of primary pressure accumulators 10a, 10b, 10c, 10d, 10e, which are filled with hydraulic oil for part of their volumes, the remaining part of their volumes being occupied by an inert gas, for example nitrogen, under pressure. The pressure to which the gas is subjected in the reservoirs is preferably approximately 300 bar.

Interposed in the path of the tube 9 from the primary pressure accumulators 10a, 10b, 10c, 10d, 10e to the pressurization device 2 are direct-pressurization valve means 11, for example, a solenoid valve the opening of which enables the pressure stored by the precompressed gas in the accumulators to be discharged onto the piston 7 of the pressurization device 2, as will be described further below.

A pump 12, drawing hydraulic oil from a reservoir 13 and admitting it to the tubing circuit 9, 9a, 9b, 9c, 9d, 9e through a charging tube 14, keeps the primary pressure accumulators 10a, 10b, 10c, 10d, 10e under pressure. In this case also, there are interposed in the path of the tube 14 from the pump 12 to the connection with the tube 9, charging-valve means 15, for example, a solenoid valve with open/shut control and, downstream thereof, a non-return valve 16, the function of which is to prevent the excess pressure being vented from the primary accumulators 10a, 10b, 10c, 10d, 10e towards the pump 12.

Downstream of the primary accumulators 10a, 10b, 10c, 10d, 10e and upstream of the respective solenoid valve 11, the tube 9 branches into a secondary tube 17. This secondary tube 17 is connected, by indirect-pressurization valve means 18, for example, a solenoid valve, to pressure-multiplier means 19 such as a hydraulic pressure-multiplier. The valve means 18 comprises two outlets, that is, a pressurization outlet 29 and a discharge outlet 30, and an inlet 32, which are controllable separately. In particular, the means 18 may be a three-way solenoid valve, operable in accordance with the following operative conditions: a) completely closed, b) pressurization outlet 29 and discharge outlet 30 in flow communication, inlet shut, c) inlet and pressurization outlet 29 in flow communication, discharge outlet 30 shut. The discharge outlet 30 discharges hydraulic oil towards the reservoir 13 by means of a duct provided with valve means 31 with open/shut control.

The pressure-multiplier 19 comprises a housing 20 made of a material suitable for withstanding high pressures. An example of this material is a multi-layer jacket such as that described in the above-mentioned European patent application No. 00830705.0 filed on 26th Oct. 2000, the description of which, in particular with regard to this multi-layer jacket and the structure of the pressurization piston, is incorporated herein by reference.

A piston 21 housed for sliding in the housing 20 has a T-shaped cross-section the larger-diameter end of which defines, together with the walls of the housing 20, a first chamber 22 filled with hydraulic oil, into which the secondary tube 17 opens. A second chamber 23, which in turn is filled with oil, is defined by the smaller-diameter end of the piston 21 and by the walls of the housing 20. The space 28 between the upper shoulder of the piston 21 and the body of the housing 20—which, at this point, has a thickness such as to be engaged for sliding by the smaller-diameter section of the piston,—defines the stroke of the piston 21. The chamber 23 is in fluid communication with a connecting duct 24 which is reconnected to the tube 9 downstream of the direct-preassurization valve means 11. A non-return valve 25 is interposed in the connecting duct 24, upstream of the point of connection with the tube 9.

The tube 9 is connected, in the portion disposed between the direct-pressurization valve means 11 and the pressurization device 2, to a duct 26 for discharging the hydraulic oil from the pressurization device 2 to the oil reservoir 13. Discharge-valve means 27, for example, a solenoid valve, are interposed in the path of the discharge duct 26.

The operation of the pressurization system according to the present invention will now be described, still with reference to FIG. 1. In normal operating conditions, the hydraulic apparatus of the pressurization system, that is, the tubes 9, 14, 24, 26, the chambers 8, 22, 23 of the pressure-multipliers and parts of the primary pressure accumulators 10a, 10b, 10c, 10d, 10e, is filled with hydraulic oil. The pump 12, which draws hydraulic oil from the reservoir 13 and admits it to the primary accumulators 10a, 10b, 10c, 10d, 10e, under pressure, through the charging tube 14, keeps the pressure of the inert gas in these accumulators above a predetermined operating level which, in the embodiment described, is about 300 bar. The non-return valve 16 prevents discharge of the pressure from the accumulators towards the pump 12.

At the beginning of a pressurization cycle, the direct-pressurization valve means 11, which are closed in the rest condition, open, allowing some of the pressure accumulated in the primary accumulators 10a, 10b, 10c, 10d, 10e to be discharged instantaneously along the tube 9 and into the chamber 8 of the pressurization device 2. During this first pressurization stage, the indirect-pressurization valve means 18 and the discharge-valve means 27 are closed. The first pressurization stage continues until the pressure in the chamber 8 is in equilibrium with that in the accumulators. If the primary accumulators 10a, 10b, 10c, 10d, 10e are of suitable dimensions so as to be able to store a potential energy much greater than that required by the above-mentioned operation and by that provided for in the second stage described below, the pressure in the chamber 8 will be substantially equal to the initial pressure of the gas in the accumulators, that is, in the embodiment described, about 300 bar. This effect is achieved, as stated, by the provision of a volume of precompressed gas definitely greater than the volume of hydraulic oil entering the chamber 8 of the pressurization device 2.

In any case, by causing the pump 12 to operate continuously even during the system-pressurization stage, it will be possible to keep the pressure in the primary accumulators 10a, 10b, 10c, 10d, 10e substantially stable and hence to avoid any excessive discharge of the potential energy accumulated therein.

At this point, the second pressurization stage begins; this provides for the closure of the direct-pressurization valve means 11 and the activation of the indirect-pressurization valve means 18. In particular, the pressurization outlet 29 will be opened and the discharge outlet 30 will be kept closed. The potential energy stored in the form of pressurized gas in the primary pressure accumulators 10a, 10b, 10c, 10d, 10e is discharged, in this case, along the secondary tube 17 and through the pressure-multiplier 19 to the chamber 8 of the pressurization device 2.

The operation of the pressure-multiplier 19, like that of the pressurization device 2, is based on the presence of a piston 21 with a T-shaped cross-section. In fact, the pressure reached at the outlet of the pressure-multiplier 19 will be proportional to the ratio between the lower surface (in contact with the chamber 22) and the upper surface of the piston. For example, if the ratio between these two areas is 2, the oil pressure will be doubled, at least as a first approximation. In the embodiment described, the pressure output by the pressure-multiplier 19 will therefore be about 600 bar. When the equilibrium condition is reached, the piston 7 of the pressurization device 2 will also be subject to this pressure, which will therefore be transferred, after suitable amplification by means of the piston 7 as described above for the piston 21, into the pressurization chamber 5 and onto the object 6 to be processed which, in the example described, is a bottle to be sterilized. With suitable dimensions of the smaller and larger surfaces 7 of the piston, it will be possible to achieve a pressure of a few thousand bar in the pressurization chamber 5.

At this point, a series of partial decompressions and compressions can be brought about simply by opening the direct-pressurization valve means 11 and closing the inlet of the indirect-pressurization valve means 18 (operative condition a) of the valve means 18, see above), until, as the oil flows towards the primary pressure accumulators 10a, 10b, 10c, 10d, 10e, the pressure in the chamber 8 is reduced to the desired level (for example, 500 bar); this operation will be followed by a closure of the direct-pressurization valve means 11 and by the simultaneous or deferred opening (according to whether the pressure is to be kept at the intermediate level for a longer or shorter period) of the indirect-pressurization means 18 (operative condition c), see above), so as to re-establish the maximum pressure (in the example described, 600 bar). This sequence of operations may be repeated in order to implement the desired pressurization cycle. Naturally, during the partial decompression stages provided for herein, the potential energy of the system will be recovered by discharge of the excess pressure to the accumulators, as will be described fully below.

Upon completion of the second pressurization stage outlined above, the decompression stage, which in turn is composed of two distinct stages, will start. During the first stage, the discharge-valve means 27 and the indirect-pressurization valve means 18 will remain closed (operative condition a), see above), whilst the direct-pressurization valve means 11 will be opened. Owing to the difference between the pressures existing in the primary pressure accumulators 10a, 10b, 10c, 10d, 10e (about 300 bar in the example described) and in the chamber 8 of the pressurization device 2 (about 600 bar in the example described) the hydraulic oil will thus flow in the opposite direction to that in which it flowed in the pressurization stage, so as to compress the gas in the accumulators until equilibrium is reached, that is, until the chamber 8 is decompressed to the equilibrium pressure of 300 bar. The non-return valve 25 will enable the pressure-multiplier 19 which, in this case, would operate in reverse, to be bypassed. The device thus clearly permits at least partial recovery of the potential energy expended in the compression of the fluid to 600 bar in the chamber 8.

When equilibrium with the pressure in the primary accumulators 10a, 10b, 10c, 10d, 10e has thus been reached, further decompression from 300 bar to atmospheric pressure does not permit recovery of energy which is therefore discharged along the discharge tube 26, after closure of the pressurization-valve means 11 and opening of the discharge-valve means 27.

It will also be necessary to re-establish atmospheric pressure in the chamber 22 of the pressure-multiplier 19. This condition is achieved by moving the valve means 18 to operative condition b) described above and opening the discharge-valve means 31. It should be noted that the pressure can be discharged from the chamber 22 of the multiplier at any moment during the entire decompression stage described above.

The entire process is controlled by an operating and control unit (not shown in the drawings), normally of the electronic type, which provides for the opening and closure of the valve means, the operation of the pump 12, and for any other additional operations such as those required by the particular application to which the pressurization system of the present invention is dedicated. In the embodiment shown in the drawings, these operations may relate to the closure and opening of the closure element 4 of the pressurization device 2, to the insertion or removal of the bottle 6, and to monitoring of temperature, pressure or any other operative conditions required. Examples of these additional operations are those described in the above-mentioned European patent application No. 00830705.0 filed on Oct 26, 2000.

Figure 2:
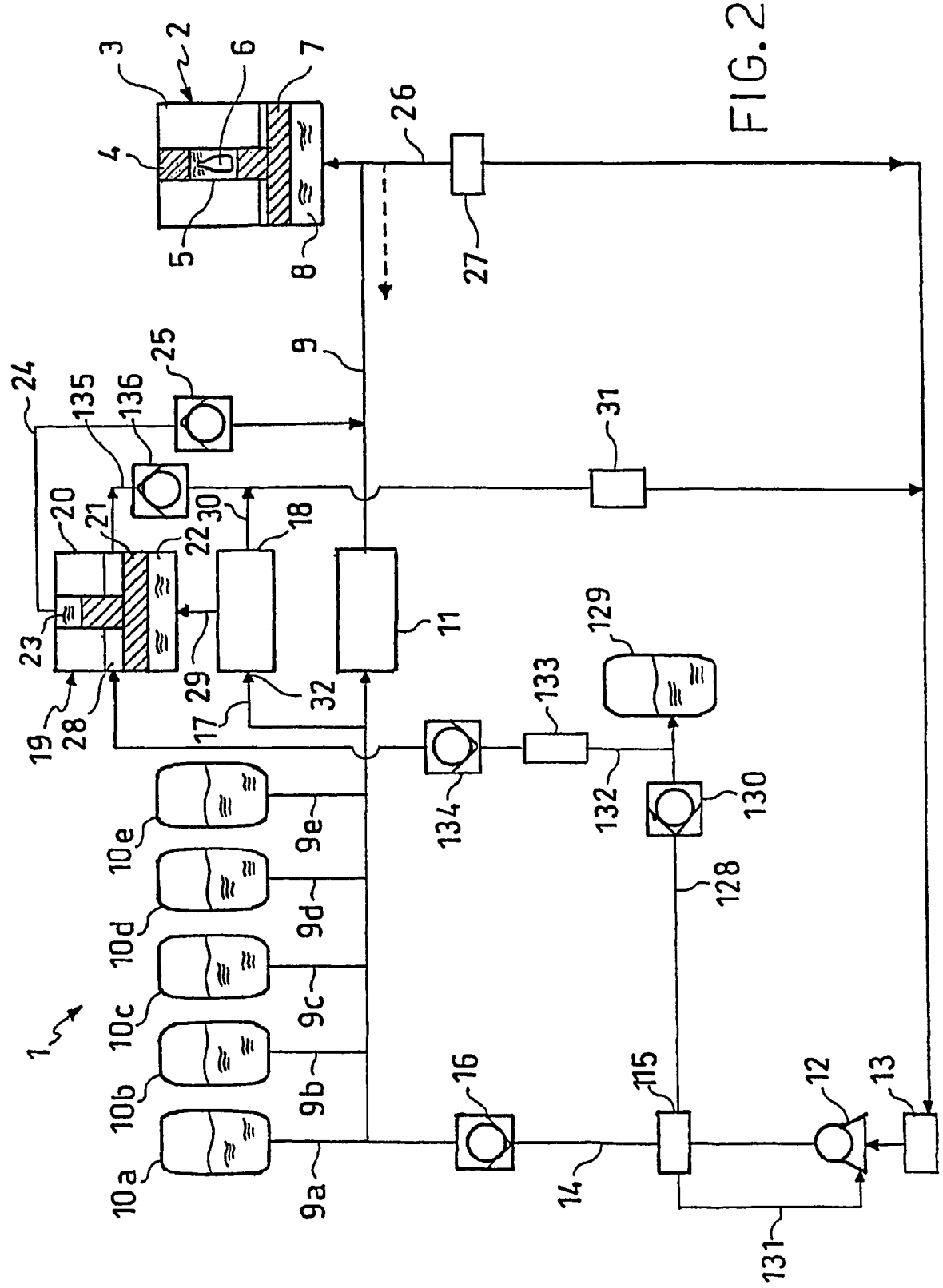
FIG. 2 is a partially-sectioned, schematic view of a second embodiment of the pressurization system of the present invention.

The embodiment of the present invention shown in FIG. 2 differs from the first embodiment described above in the provision of a third hydraulic circuit entrusted with performing some auxiliary functions of the system, in particular, the resetting of the piston 21 of the pressure-multiplier 19, that is, its return to its initial position upon completion of the pressurization cycle. In FIG. 2, reference numerals the same as those indicated in FIG. 1 correspond to the same parts of the system. The pressurization system will therefore be described only with reference to the additional characteristics, the foregoing description remaining the same for the rest of the system.

The charging-valve means 115 disposed downstream of the pump 12 have three separately controllable outlets. The first outlet is connected to the charging tube 14, as described above. A second outlet is in fluid communication with a secondary charging tube 128 which in turn is connected to a secondary pressure accumulator 129. A non-return valve 130 is disposed upstream of this accumulator. A third outlet is in fluid communication with a recirculation duct 131 which returns the hydraulic oil to the pump when the other two outlets of the valve means 115 are closed. This arrangement enables the pump 12 always to be kept in operation throughout the operation of the system, avoiding constant starting and stopping which are detrimental to the operation of the pump.

The secondary accumulator 129 is just the same as the primary accumulators 10a, 10b, 10c, 10d, 10e described above, with the sole possible difference that the pressure of the gas compressed inside it may be kept lower than that of the primary accumulators because of the lower energy normally required by the auxiliary operations to which the secondary accumulator is dedicated. In the example described, this pressure is about 150 bar.

The secondary charging tube 128 is in fluid communication, in the portion between the non-return valve 130 and the secondary accumulator 129, with an auxiliary tube 132 which opens inside the pressure-multiplier 19 in the space 28 which defines the stroke of the piston 21. Interposed in this auxiliary tube 132 are valve means 133 with open/shut control and, downstream thereof, a non-return valve 134. A discharge tube 135 provided with a non-return valve 136, puts the space 28 into flow communication with the tube connected to the discharge outlet 30 of the valve means 18, upstream of the valve means 31.

The operation of the pressurization system according to the embodiment of FIG. 2 is exactly the same as that described above for the first embodiment. At the accumulator-charging stage, the charging-valve means 115 will keep the outlets towards the tubes 14 and 128 open whilst the outlet towards the recirculation duct 131 will remain closed. The pressurization-valve means 133, as well as the means 11, will be closed. During the pressurization stage already described above, the valve means 133 of the auxiliary tube 132 will remain closed whilst the valve means 31 will be in the open condition. As already described, at this stage, the secondary pressurization-valve means 18 will be either in operative condition a) (first pressurization stage) or in operative condition c) (second pressurization stage). Upon completion of the pressurization cycle described above, the valve means 31 will be closed and the valve means 133 will be opened and will provide for the admission of oil under pressure to the space 28, causing the piston to return to its starting position. Upon completion of this operation, the valve means 31 will be opened and the valve means 18 will be put in operative condition b), enabling the pressure accumulated in the chamber 22 and in the space 28 of the pressure-multiplier 19 to be discharged.

As stated above, the pump 12 advantageously operates continuously during the period for which the plant is in operation. The system of the present invention may advantageously comprise pressure sensors for detecting the pressure in the primary pressure accumulators 10a, 10b, 10c, 10d, 10e and in the secondary accumulator 129. These pressure sensors send a signal to the operating and control unit that controls the outlets of the valve means 115 which are connected, respectively, to the charging tube 14, to the secondary charging tube 128, or to the recirculation duct 131. For example, when the pressure in the primary accumulators 10a, 10b, 10c, 10d, 10e reaches the pressure set (in the embodiment described, about 300 bar), the outlet of the valve relating to the tube 14 is thus blocked. Similarly, when the desired pressure of about 150 bar is reached in the secondary accumulator 129, the outlet for the tube 128 is blocked. When both of the outlets for the tubes 14 and 128 are closed, the operating and control unit provides for the outlet to the recirculation duct 131 to be opened. The system of the invention thus enables the pressure in the pressure accumulators to be kept almost constant, without the need to interrupt the operation of the pump 12, even during the stage of the pressurization of the pressurization device 2.

Figure 3:
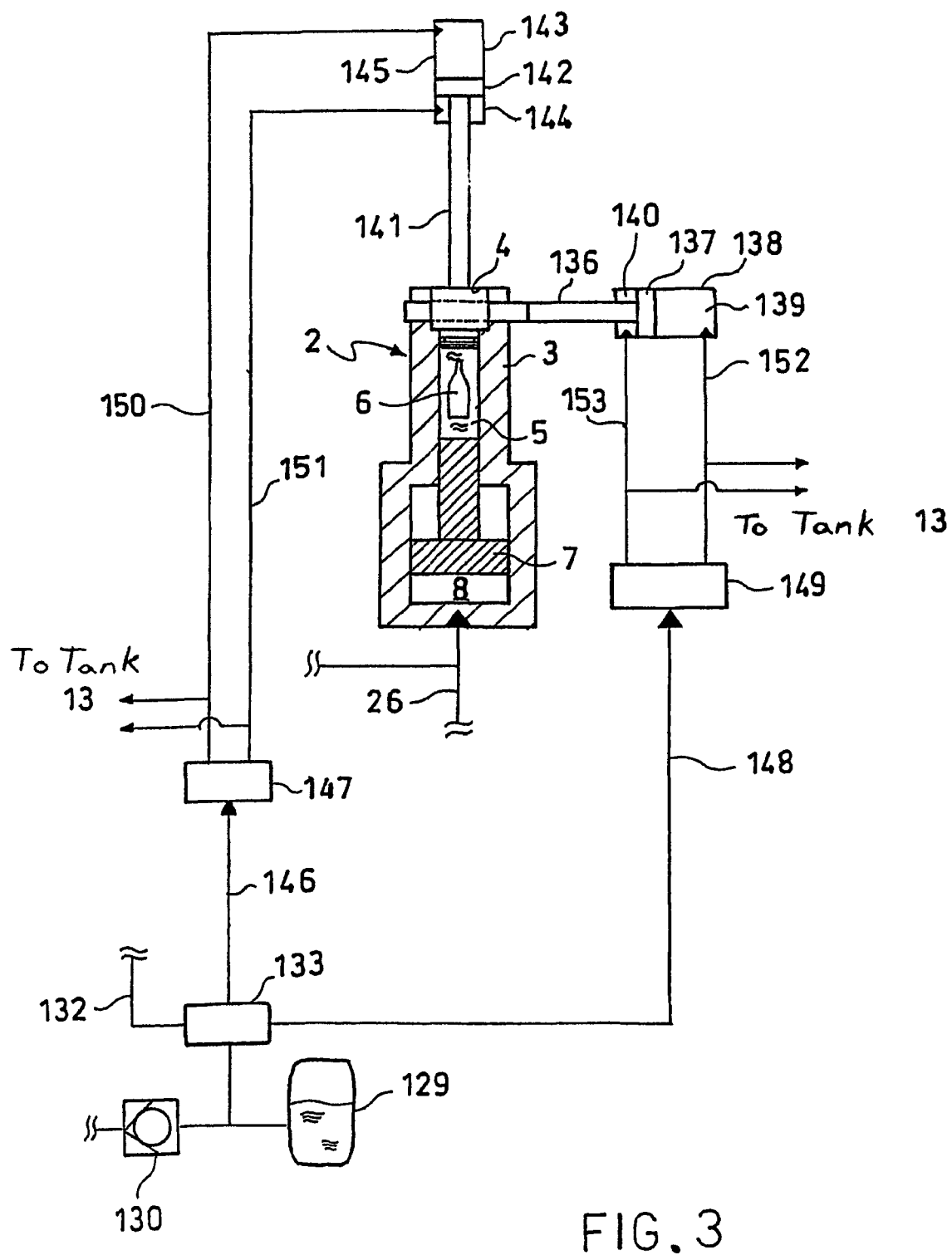
FIG. 3 is a partially-sectioned, schematic view of a detail of the pressurization system of the invention, in accordance with a third embodiment.

As shown in FIG. 3, according to a further embodiment, the secondary hydraulic circuit connected to the secondary pressure accumulator 129 also operates the mechanism for opening and closing the pressurization device 2.

With regard to the description of the pressurization device 2, in particular with regard to the structure of the closure element 4 and its opening and closure mechanism, specific reference is made here to the description of the above-mentioned European patent application No. 00830705.0 filed on 26th Oct. 2000, which is incorporated herein by reference. The closure element 4 is a cylinder with a transverse through-hole for the insertion of a pin 136. The pin 136 also extends through the wall of the housing 3 of the device and has the function of a lock for the closure element 4 so as to cope with the axial thrusts of the system. The pin 136 constitutes the shaft of a piston 137 housed for sliding in a housing 138 of the pin piston. The piston 137 defines, in the housing 138, a return chamber 140 (which the surface of the piston carrying the pin 136 faces) and a thrust chamber 139 (which the opposite surface of the piston faces). The closure element 4 is fixed at the top to a shaft 141 which in turn terminates, at its opposite end, in a piston 142 housed for sliding in a housing 143 of the closure piston. In this case also, the piston 142 defines in the housing 143, a return chamber 144 (which the surface of the piston carrying the shaft 141 faces) and a thrust chamber 145 (which the opposite surface of the piston faces).

In this embodiment, the valve means 133 connected to the secondary pressure accumulator 129 will have three outlets. The first outlet is connected to the secondary tube 132, as described above. The second outlet is in fluid communication, by means of a duct 146, with closure-control valve means 147. The third outlet is in fluid communication, by means of a duct 148, with pin-control valve means 149. The three outlets are operable independently.

The closure-control valve means 147 in turn have two outlets. The first outlet is connected to a thrust tube 150 which brings hydraulic oil to the thrust chamber 145 of the closure-piston housing 143. The second outlet is connected to a return tube 151 which brings hydraulic oil to the return chamber 144 of the closure-piston housing 143.

Similarly, the pin-control valve means 149 has two outlets. The first outlet is connected to a thrust tube 152 which brings hydraulic oil to the thrust chamber 139 of the pin-piston housing 138. The second outlet is connected to a return tube 153 which brings hydraulic oil to the return chamber 140 of the pin-piston housing 138.

Both the thrust tubes 150, 152 and the return tubes 151, 153 are in flow communication with respective ducts which recirculate the oil to the reservoir 13. Each of these ducts has valve means (not shown in the drawing) which open and close alternately.

For example, during the closure of the closure element, the sequence of operations will be as follows. The outlet of the valve means 133 to the duct 146 is opened and, at the same time, the closure-control valve means 147 open the outlet to the thrust tube 150 which admits oil to the thrust chamber 145. The oil present in the return chamber 144 will therefore be pumped along the return tube 151 by the piston and, finding the valve means 147 closed, will be directed into the duct which recirculates the oil to the reservoir 13, the valve of which will therefore be in the open condition.

As a result of the thrust of the oil, the closure element 4 will fall onto the opening of the housing 3 of the pressurization device 2 to block this opening. At this point, the valve means 147 will keep both of the outlets in the closed condition, whilst the valve means 149 will open the outlet for the thrust tube 152. The pin 136 will also be inserted through the holes in the casing 3 of the device and of the closure element 4 by a mechanism similar to that described above for the closure element 4. During this operation, the oil discharged from the return chamber 140 of the pin-piston housing 138 will be directed into the respective recirculation duct towards the reservoir 13, after the valve means connected thereto have been opened. The same sequence of steps will be repeated, but in reverse, for the release and removal of the closure element 4 upon completion of the pressurization cycle.

The advantages of the pressurization system of the present invention are immediately clear from the foregoing description.

First of all, the system provides for the storage of potential energy in the form of pressurized gas in the pressure accumulators and its instantaneous release at the moment of use by kinetics approaching those of a deflagration. This mechanism reduces to the minimum the times required for the pressurization stage so that cycles comprising pressurizations and partial decompressions can be performed in accordance with predetermined profiles which are particularly advantageous in some applications (for example, sterilization of foods or beverages in containers). For example, it will be possible to bring the pressure in the chamber 8 of the pressurization device 2 from atmospheric pressure to 600 bar in about 5 seconds, and partial decompression to 500 bar and repressurization to 600 bar may require only about 2 seconds.

In the second place, the provision of a pressure-multiplier 19 which can be operated at the pressurization stage and bypassed at the decompression stage permits partial recovery of the potential energy, optimizing the energy cycle of the system.

The provision of the secondary pressure accumulator 129 has the advantage that some auxiliary functions such as the resetting of the pressure-multiplier piston and the opening/closure of the closure element of the pressurization device are also brought about by the same hydraulic system and within the same short times. For example, this latter operation can also be carried out in a time generally of between 4 and 4.5 seconds.

Finally, since the pressurization system according to the invention is composed substantially of a hydraulic circuit, mechanical componentry (mechanical actuators, cams, etc.) can be minimized, with a consequent reduction in the maintenance costs of the system.

Naturally, only some specific embodiments of the pressurization device of the present invention have been described and a person skilled in the art will be able to apply thereto all modifications necessary to adapt them to particular applications without, however, departing from the scope of protection of the present invention.

For example, the number of primary pressure accumulators 10a, 10b, 10c, 10d, 10e may be increased or reduced according to the requirements and the size of the plant. Similarly, it will be possible to provide more than one secondary pressure accumulator 129, in dependence on the type and quantity of additional operations to which it is to be dedicated.

The invention claimed is:

1. A pressurization system for modifying the pressure in a pressurization device, the system comprising a first hydraulic circuit in which one or more primary pressure accumulators are connected to the pressurization device in a controlled manner in order to permit a substantially incompressible fluid to be admitted to, or recovered from, the pressurization device at a first pressure, and an operating and control unit which governs operation of the system, wherein the primary pressure accumulators are precompressed-gas pressure accumulators and the operating and control unit controls the operation of pumping means and the operation of valve means, based upon readings of temperature and pressure sensors of the system.

2. A pressurization system according to claim 1, the system comprising a second hydraulic circuit in which the primary pressure accumulator or accumulators are connected to the pressurization device in controlled manner by means of a pressure-multiplier means in order to admit the incompressible fluid to the device at a second pressure greater than the first pressure.

3. A pressurization system according to claim 2, the first and second hydraulic circuits being in flow communication with pumping means which draw the incompressible fluid from a reservoir and admit it to the first and second hydraulic circuits.

4. A pressurization system according to claim 3 in which the pumping means are connected to the primary pressure accumulators by means of a charging tube in which valve means with open/shut control and, downstream thereof, a non-return valve, are interposed.

5. A pressurization system according to claim 2, in which the second hydraulic circuit comprises a secondary pressurization tube which originates from the primary tube and which is connected, by indirect-pressurization valve means, to the pressure-multiplier means, the pressure-multiplier means in turn being in flow communication with a connecting duct in which a non-return valve is interposed and which is reconnected to the direct-pressurization tube downstream of the point of origin of the secondary pressurization tube.

6. A pressurization system according to claim 5 in which the pressure-multiplier means comprises a housing inside which a piston with a T-shaped cross-section is housed for sliding, the larger-diameter end of the piston defining, together with the walls of the housing, a first chamber which is filled with an incompressible fluid and into which the secondary pressurization tube opens, a second chamber which, in turn, is filled with the incompressible fluid, being defined by the smaller-diameter end of the piston and by the walls of the housing, the second chamber being in fluid communication with the connecting duct.

7. A pressurization system according to claim 5, in which the indirect-pressurization valve means comprise an inlet, a pressurization outlet in flow communication with the first chamber of the pressure-multiplier means, and a discharge outlet in flow communication with a duct provided with valve means with open/shut control, for the recirculation of the incompressible fluid to the reservoir.

8. A pressurization system according to claim 7 in which the indirect-pressurization valve means can be operated in accordance with the following operative conditions: a) completely closed, b) pressurization outlet and discharge outlet in flow communication, inlet shut, c) inlet and pressurization outlet in flow communication, discharge outlet closed.

9. A pressurization system according to claim 8, in which the tube of the first hydraulic circuit is connected to a duct for discharging to the reservoir the substantially incompressible fluid originating from the pressurization device, the discharge duct comprising discharge-valve means.

10. A pressurization system according to claim 2, the system further comprising a third hydraulic circuit comprising one or more secondary pressure accumulators which are connected to the pressure-multiplier means and to the pressurization device in controlled manner in order to reset the piston and/or to actuate the kinematic mechanism for the opening/closure of the removable closure element.

11. A pressurization system according to claim 10 in which the secondary pressure accumulators are connected, by means of an auxiliary tube comprising, in sequence, valve means and a non-return valve, to the space defined between a shoulder of the piston, formed at the junction point between the two portions of the piston with different diameters, and the thicker portion of the housing of the pressure-multiplier means.

12. A pressurization system according to claim 11, in which the valve means comprise a first outlet connected to the auxiliary tube, a second outlet in fluid communication with closure-control valve means, and a third outlet in fluid communication with pin-control valve means, the three outlets being operable independently.

13. A pressurization system according to claim 12 in which the closure-control valve means in turn comprise a first outlet in fluid communication with a thrust chamber of a housing of a closure piston and a second outlet in fluid communication with a return chamber of the housing, and in which the pin-control valve means in turn comprise a first outlet in fluid communication with the thrust chamber (139) of the housing of the pin piston and a second outlet in fluid communication with the return chamber of the housing.

14. A pressurization system according to claim 12 in which the space in the pressure-multiplier means, one or more thrust chambers, and one or more return chambers are in flow communication with respective ducts for recirculating the substantially incompressible fluid to the reservoir.

15. A pressurization system according to claim 10, in which charging-valve means are provided, disposed downstream of the pump and having a first outlet connected to the charging tube, a second outlet in fluid communication with the secondary pressure accumulators, and a third outlet in fluid communication with a duct for recirculating the substantially incompressible fluid to the reservoir, the three outlets being operable separately.

16. A pressurization system according to claim 1, in which the first hydraulic circuit comprises a direct-pressurization tube in which direct-pressurization valve means are interposed, the tube putting the primary pressure accumulators into flow communication with the pressurization device.

17. A pressurization system according to claim 1, in which the pressurization device comprises a housing which has a removable closure element and inside which is defined a pressurization chamber for housing one or more objects to be processed at high hydrostatic pressures, a piston with a T-shaped cross-section acting in the pressurization chamber, the larger-diameter end of the piston defining, together with the walls of the housing, a chamber filled with a substantially incompressible fluid, and the chamber being connected to the direct-pressurization tube for the admission of the substantially incompressible fluid to the chamber at high pressure.

18. A pressurization system according to claim 1 in which the pressure accumulators comprise pressure sensors operatively connected to the valve means which are connected to the charging tube, to the secondary pressure accumulators, and to the recirculation duct, respectively.

19. A pressurization system according to claim 1, further comprising a pressure multiplier means and wherein the primary pressure accumulators are charged to approximately 300 bar and secondary pressure accumulators are charged to approximately 150 bar, and in which the ratio between the areas of the end surfaces of the piston of the pressure-multiplier means is approximately 2.

20. A method of pressurizing objects to be processed, comprising the steps of:
  a) providing a pressurization system comprising a first hydraulic circuit in which one or more primary pressure accumulators are connected to a pressurization device in a controlled manner in order to permit a substantially incompressible fluid to be admitted to, or recovered from, the pressurization device at a first pressure, the primary pressure accumulators being precompressed-gas pressure accumulators, b) putting the primary pressure accumulators, which are kept at a first pressure, into flow communication with the chamber of the pressurization device, by means of the first hydraulic circuit, until equilibrium is reached, c) putting the primary pressure accumulators, which are kept at a first pressure, into flow communication with the chamber of the pressurization device, by means of the second hydraulic circuit, until the second pressure greater than the first pressure is reached, d) maintaining the second pressure in the chamber of the pressurization device for a predetermined period, or bringing about a series of partial decompressions to a third pressure between the first and second pressures and compressions to the second pressure, e) returning the pressure in the chamber of the pressurization device to the first pressure by closure of the indirect-pressurization valve means and opening of the direct-pressurization valve means so as to recover potential energy in the form of compressed gas in the primary pressure accumulators, f) returning the pressure in the chamber of the pressurization device to atmospheric pressure by discharge of the substantially incompressible fluid towards the reservoir.

21. A method according to claim 20 in which the first pressure is approximately 300 bar, the second pressure is approximately 600 bar, and the third pressure is approximately 500 bar.

22. A method according to claim 20, in which steps b) to f) are performed within a period of between 10 seconds and 20 seconds.

* * * * *

UNITED STATES PATENT AND TRADEMARK OFFICE
CERTIFICATE OF CORRECTION

PATENT NO. : 7,107,766 B2  Page 1 of 1
APPLICATION NO. : 10/474166
DATED : September 19, 2006
INVENTOR(S) : Vanni Zacche' et al.

It is certified that error appears in the above-identified patent and that said Letters Patent is hereby corrected as shown below:

In SECTION 73:
Please change the assignee's name to read as follows:

SIMONAZZI S.P.A.

Signed and Sealed this

Seventh Day of October, 2008

JON W. DUDAS
*Director of the United States Patent and Trademark Office*